United States Patent
Kang et al.

(10) Patent No.: US 9,784,756 B2
(45) Date of Patent: Oct. 10, 2017

(54) APPARATUS AND METHOD OF MEASURING WEB FEEDING VELOCITY BY USING SINGLE FIELD ENCODER

(71) Applicant: KOREA INSTITUTE OF MACHINERY & MATERIALS, Daejeon (KR)

(72) Inventors: Dongwoo Kang, Daejeon (KR); Taik Min Lee, Daejeon (KR); Seung-Hyun Lee, Daejeon (KR); Young Man Choi, Daejeon (KR); Deokkyun Yoon, Daejeon (KR); Kwang-Young Kim, Daejeon (KR); Jeongdai Jo, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 729 days.

(21) Appl. No.: 14/273,745

(22) Filed: May 9, 2014

(65) Prior Publication Data
US 2014/0333919 A1    Nov. 13, 2014

(30) Foreign Application Priority Data

May 10, 2013  (KR) .......................... 10-2013-0052844

(51) Int. Cl.
*G01P 3/36* (2006.01)
*G01P 3/54* (2006.01)

(52) U.S. Cl.
CPC ...................................... *G01P 3/54* (2013.01)

(58) Field of Classification Search
CPC ........................................................ G01P 3/54
See application file for complete search history.

(56) References Cited

U.S. PATENT DOCUMENTS 5,084,791 A *  1/1992  Thanos ................ G11B 5/5556
                                                 360/77.03
6,064,467 A    5/2000  Takizawa
(Continued)

FOREIGN PATENT DOCUMENTS

JP    1999-240140    9/1999
JP    2002-54952     2/2002
(Continued)

OTHER PUBLICATIONS

K.K. Tan et al., "New Interpolation Method for Quadrature Encoder Signals", IEEE Transactions on Instrumentation and Measurement, Oct. 2002, vol. 51, No. 5.

(Continued)

*Primary Examiner* — Samantha K Abraham
(74) *Attorney, Agent, or Firm* — Lex IP Meister, PLLC

(57) ABSTRACT

A method of measuring feeding velocity of a web, on which a scale having pitches different from pitches of a mask are formed, is provided. The method includes: calculating a number of vibrations of a moiré image of light passing through the mask and the scale; calculating pitches of the scale of the fed web based on the calculated number of vibrations of the moiré image; averaging the pitches of the scale so that a change in a pitch between adjacent timings among the calculated pitches of the scale is minimized; extracting first signals corresponding to our phases for one pitch based on the averaged pitches of the scale; calculating two second signals for forming a Lissajous circle from the first signals; and calculating an angle of the Lissajous circle by the two second signals and then calculating the feeding velocity of the web by using the calculated angle.

11 Claims, 23 Drawing Sheets

(56) References Cited

U.S. PATENT DOCUMENTS

| | | | |
|---|---|---|---|
| 6,490,497 B1* | 12/2002 | Mitsuhashi | H01L 22/26 257/E21.528 |
| 6,542,253 B1 | 4/2003 | Kim | |
| 6,930,801 B2* | 8/2005 | Inoue | H04N 1/4051 358/3.14 |
| 2004/0233461 A1* | 11/2004 | Armstrong | G01C 11/025 356/620 |
| 2006/0082796 A1 | 4/2006 | Jeong | |
| 2009/0267781 A1 | 10/2009 | Makinouchi | |
| 2012/0292539 A1 | 11/2012 | Makinouchi | |
| 2014/0114615 A1* | 4/2014 | Nagai | G01B 9/02098 702/189 |

FOREIGN PATENT DOCUMENTS

| | | |
|---|---|---|
| KR | 10-0208033 | 9/1998 |
| KR | 10-1998-081528 | 11/1998 |
| KR | 10-1998-0081542 | 11/1998 |
| KR | 10-2002-0016425 | 3/2002 |
| KR | 10-2006-0034099 | 4/2006 |
| KR | 10-2009-0080504 | 7/2009 |
| KR | 10-2012-001603 | 2/2012 |
| KR | 10-2012-0013127 | 2/2012 |
| KR | 10-2012-0016035 | 2/2012 |

OTHER PUBLICATIONS

Dongwoo Kang, et al., "Direct and precise measurement of displacement and velocity of flexible web in roll-to-roll manufacturing systems", Review of Scientefic Instrucments 84, 125005, Dec. 11, 2013.

* cited by examiner

FIG. 6
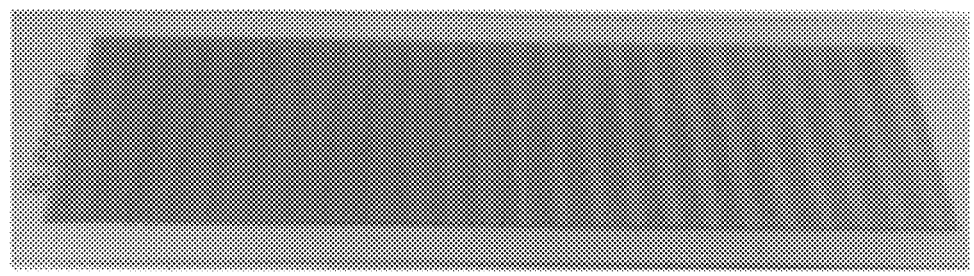
(a)
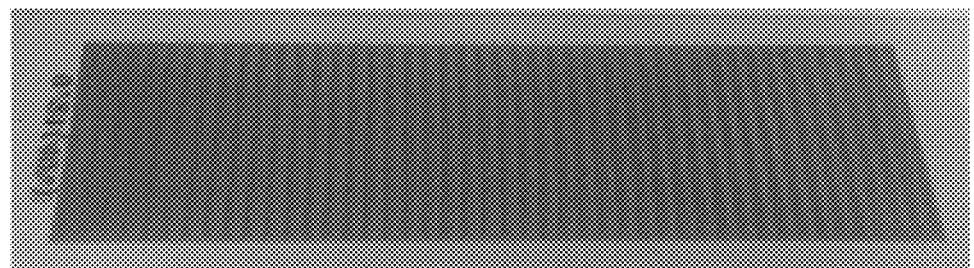
(b)

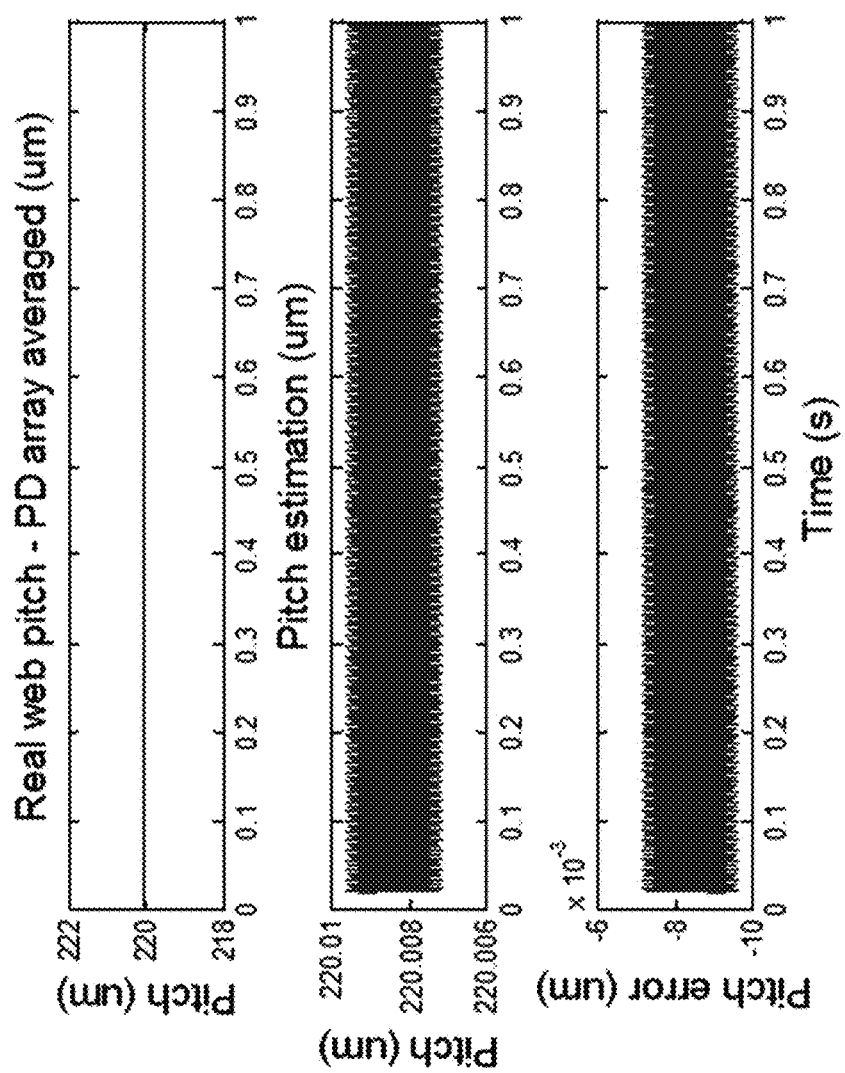

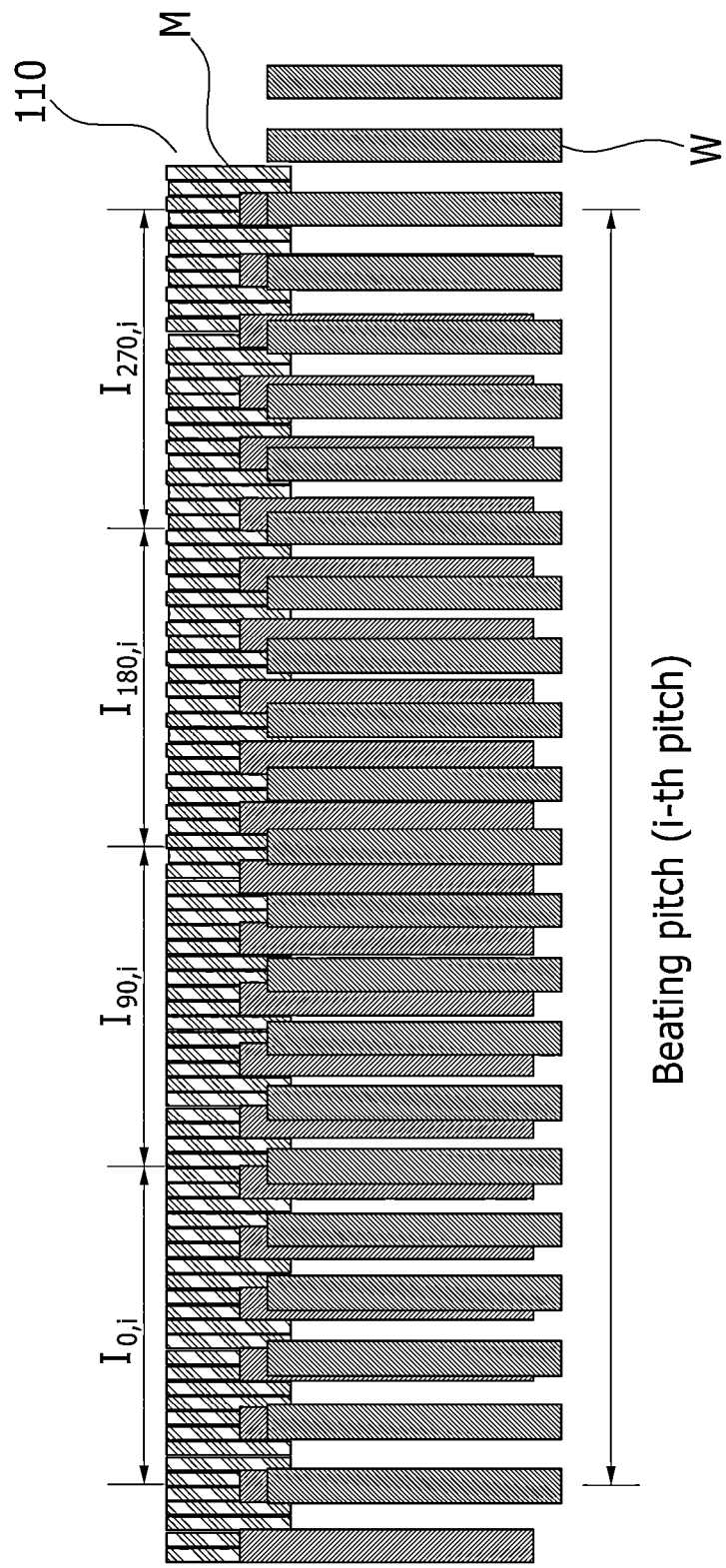

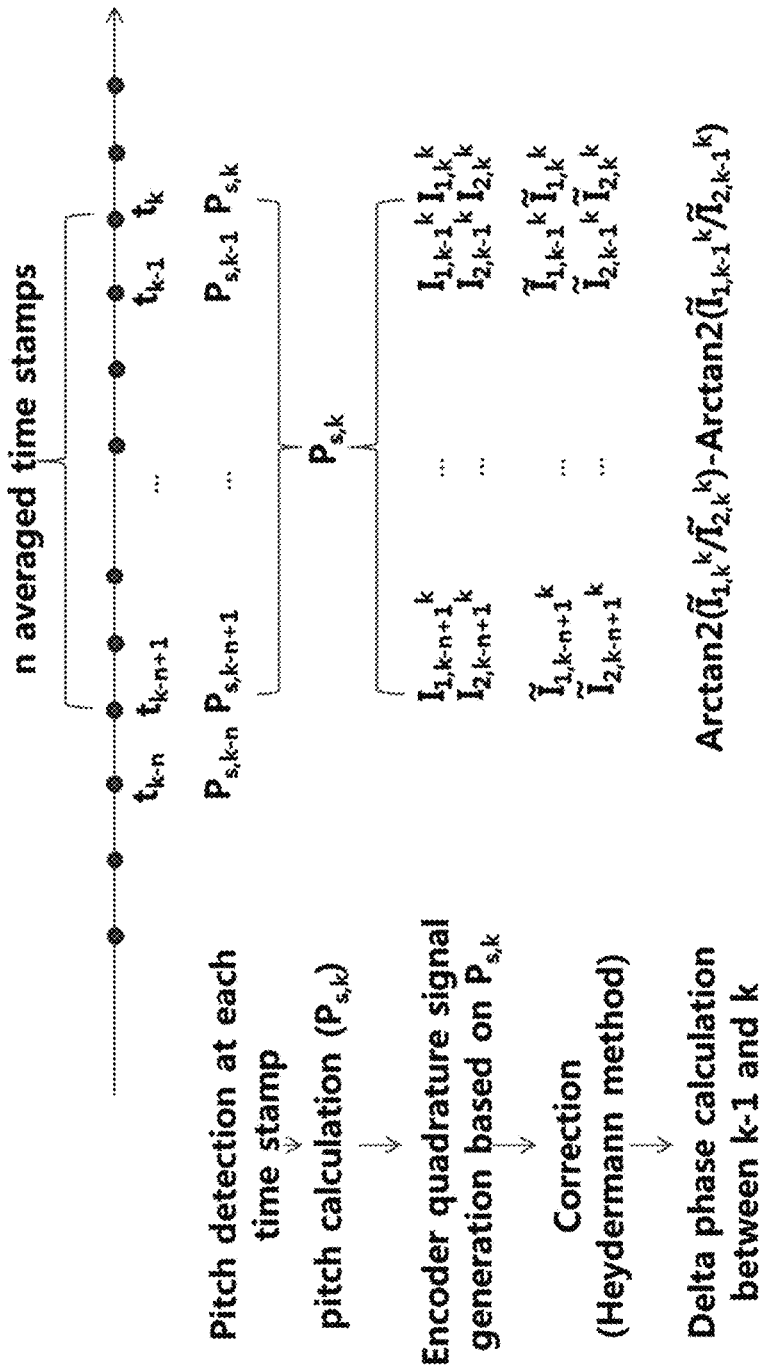

FIG. 15
| Error models to be considered | Lissajous figure of signals with errors |
|---|---|
| Harmonic errors | 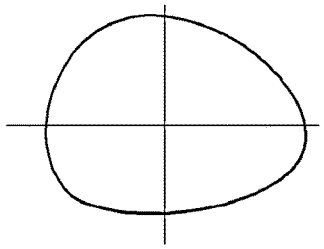 |
| non-orthogonal error, inequality in amplitude of two signals and residual DC voltages | 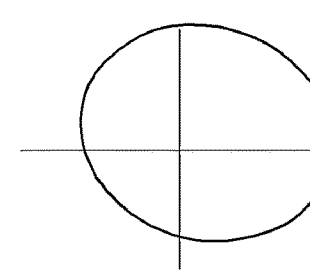 |
| Random error | 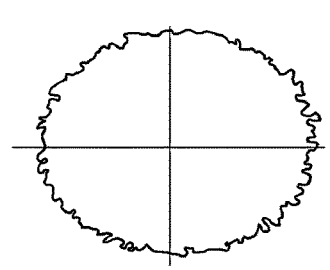 |

APPARATUS AND METHOD OF MEASURING WEB FEEDING VELOCITY BY USING SINGLE FIELD ENCODER

CROSS-REFERENCE TO RELATED APPLICATION

This application claims priority to and the benefit of Korean Patent Application No. 10-2013-0052844 filed in the Korean Intellectual Property Office on May 10, 2013, the entire contents of which are incorporated herein by reference.

BACKGROUND OF THE INVENTION (a) Field of the Invention

The present invention relates to an apparatus and a method of measuring feeding velocity of a web by using an encoder.

(b) Description of the Related Art

Recently, a technology for producing low-cost consumable electronic device products, such as radio frequency identification (RFID), a solar cell, and electronic paper, having accuracy of a level or several to several tens of micrometers by using a printing process on a flexible substrate (web) has been suggested.

To this end, a plastic substrate is used instead of a high-priced silicon wafer in view of a material, and a low cost process of performing direct printing at a low temperature, such as an inkjet process, a gravure printing method, and a screen printing method, has been researched in terms of a process, and a roll to roll printing process has recently become a consideration for maximizing productivity compared to an inline supply method.

In this case, the roll to roll printing method is a contact-type printing method of coating ink on a printing roll, and directly transferring the ink to a substrate (hereinafter referred to as a "web") formed of plastic or a thin metal film, and includes a gravure method, a flexography method, an off-set method, and the like.

A technology necessary for the roll to roll printing process and equipment technology development generally includes a printing process equipment technology, a roll to roll web feeding control technology, and the like.

In this case, in order to print a precise pattern on the web, velocity of the roll needs to be matched with feeding velocity of the web. When the velocity of the web is not matched with the velocity of the roll, the pattern printed on the web may overlap, or may be printed at a position other than where the pattern needs to be actually printed.

In this case, in order to measure the feeding velocity of the web, a method using a linear encoder is suggested in the related art as illustrated in FIGS. 1 and 2.

FIG. 1 is a conceptual view illustrating an apparatus for measuring web feeding velocity by using an encoder in the related art, and FIG. 2 is a conceptual view illustrating an apparatus for measuring web feeding velocity by using a 4-field encoder in the related art.

As illustrated in FIGS. 1 and 2, the apparatus for measuring web feeding velocity according to the related art includes a web W on which a scale S is formed and a mask R disposed on the web W to allow light to pass through at a specific pitch, and a detection unit measures a change in intensity of light passing through the scale S and the mask R to measure the feeding velocity of the web W.

In this case, the feeding velocity of the web is calculated by forming a Lissajous circle by using the change in the intensity of light measured by the detection unit, and then calculating a specific angle of the Lissajous circle.

However, it is difficult for the apparatus for measuring web feeding velocity according to the related art to measure feeding velocity of the web in the case where a scale pitch or a line width of the web W is changed. More particularly, the apparatus for measuring web feeding velocity according to the related art measures a change in intensity of light for each of four phases, and in this case, when a pitch of a scale or a line width corresponding to each phase is not matched, it is difficult to accurately calculate feeding velocity.

Further, in the case where a change in a pitch is small, measurement accuracy is decreased, and when a change in a pitch exceeds a predetermined level, a degree of signal distortion is increased, so that measurement itself is impossible.

The apparatus and method for calculating feeding velocity of a web by using a signal for each of the four phases described above are described in related art literature below in detail, so detailed descriptions thereof will be omitted.

RELATED ART LITERATURE

Patent Document (Patent Document 1) 1. Korean Patent No. 1121680
(Patent Document 2) 2. Korean Patent No. 0304162
(Patent Document 3) 3. Korean Patent No. 1232890
(Patent Document 4) 4. Japanese Patent Laid-Open Publication No. 1999-240140

Non-Patent Document (Non-Patent Document 1) Thesis K. K. Tan et al., "New Interpolation Method for Quadrature Encoder Signals", IEEE Transactions on Instrumentation and Measurement, Vol. 51, No. 5, 2002

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for measuring web feeding velocity, which is capable of precisely measuring feeding velocity of a web even in the case where a scale pitch is changed or a line width is changed.

An exemplary embodiment of the present invention provides a method of measuring feeding velocity of a web, on which a scale having a different pitch from a pitch of a mask is formed, the method including: calculating a number of vibrations of a moiré image of light passing through the mask and the scale; calculating scale pitches of the fed web based on the calculated number of vibrations of the moiré image; averaging the pitches so that a change in a pitch between adjacent timings among the calculated scale pitches is minimized; extracting first signals corresponding to a plurality of phases for one pitch based on the averaged pitch; calculating second signals for forming a Lissajous circle; and calculating an angle of the Lissajous circle by the second signals for forming the Lissajous circle and then calculating the feeding velocity of the web by using the calculated angle.

The calculating of the number of vibrations of the moiré image may include extracting only a low band vibration number component in the signal generated by the image sensor, and then calculating the number of vibrations of the moiré image based on the extracted low band vibration number component, or performing auto-correlation and then FFT on the low band vibration number component.

The calculating of the number of vibrations of the moiré image may adopt at least one of a Gaussian window and a second order polynomial regression method in a log scale of an FFT graph in order to improve accuracy of calculating the number of vibrations of the moiré image.

The calculating of the scale pitches of the fed web based on the calculated number of vibrations of the moiré image may include calculating the number of vibrations of the scale by Equation below, and then calculating the scale pitch based on the calculated number of vibrations of the scale.

$$f_s = f_r - f_b$$

Herein, $f_s$ is a spatial frequency of the scale, $f_r$ is a spatial frequency (known value) of the mask, and $f_b$ is a frequency of the moiré image, and Equation 1 corresponds to the case where an interval of a grating of the mask is larger than that of a grating of the scale, and in an opposite case, a signal is changed to positive (+) to be applied.

The averaging of the calculated pitches of the scale may include processing a pitch at a specific time and pitches at a plurality of precedent times by a least squares method to calculate the processed pitch as an averaged scale pitch, or arithmetically averaging a pitch at a specific time and pitches at a plurality of precedent times to calculate the arithmetically averaged pitch as an averaged scale pitch. Otherwise, the averaging of the pitches of the calculated scale may include selecting a pitch at a specific time to use the selected pitch as the averaged scale pitch.

In this case, the number of first signals corresponding to the plurality of phases may be four, and the number of second signals for forming the Lissajous circle may be two.

The calculating of the two signals for forming the Lissajous circle may include extracting and averaging signal intensities corresponding to four phases (0°, 90°, 180°, and 270°) for one pitch based on the corrected scale pitch, and the two signals for forming the Lissajous circle may be calculated by Equation below.

$$\overline{u_1} = I_0 - I_{180},$$

$$\overline{u_2} = I_{90} - I_{270},$$

Herein, $I_0$ is a signal intensity at a phase of 0°, $I_{90}$ is a signal intensity at a phase of 90°, $I_{180}$ is a signal intensity at a phase of 180°, and $I_{270}$ is a signal intensity at a phase of 270°.

Further, the method may further include correcting the Lissajous circle by calculating the two signals for forming the Lissajous circle and then correcting the two calculated signals.

Further, SQ may be calculated by Equation below after the correcting of the Lissajous circle, and when the SQ is equal to or smaller than a predetermined threshold value, a current measurement value may be ignored and a measurement value of a previous time zone may be used.

$$SQ = 1 - \sum_{i=1}^{n_{p,ave}} \frac{d_i}{n_{p,ave}}$$

wherein $d_i$ is a distance to a circle having a radius of 1 at a point corresponding to each signal after the correction of the Lissajous circle, and $n_{p,ave}$ is the number of signals.

Further, when there is a point at which the calculated feeding velocity of the web is sharply changed, a plurality of image sensors having different characteristics may be provided to receive signals before and after the point at which the calculated feeding velocity of the web is sharply changed, respectively.

In this case, the light passing through the mask and the scale may be detected by a single image sensor in which a plurality of detection units are integrated.

Another exemplary embodiment of the present invention provides an apparatus for measuring feeding velocity of a web, on which a scale having a different pitch from a pitch of a mask is formed, the apparatus including: a light source configured to provide collimated light to the mask side; a single image sensor in which a plurality of detection units for detecting light emitted from the light source to pass through the scale are integrated; and a calculation unit configured to calculate feeding velocity of the web by using the signals detected by the image sensors, in which the calculation unit calculates a scale pitch of the fed web based on the detected signals, extracts signals corresponding to four phases for one pitch based on the calculated scale pitch, forms a Lissajous circle by using the signals corresponding to the four phases, and then calculates the feeding velocity of the web by using the formed Lissajous circle.

Characteristics and advantages of the present invention will be more apparent by following the detailed descriptions based on the accompanying drawings.

Before the description, terms or words that are used in the present specification and claims should not be understood as having general and lexical meaning, and should be understood as having meanings and concepts that correspond to the technical spirit of the present invention in consideration of the principle that the concept of the term can be appropriately defined in order to describe the invention by using the best method by the inventor.

According to the exemplary embodiments of the present invention, the method of measuring web feeding velocity may precisely measure feeding velocity of a web even when a scale pitch is changed or a line width is changed.

BRIEF DESCRIPTION OF THE DRAWINGS

FIGS. 6 (a) and (b) are pictures of a formed moiré image viewed when gratings, of which pitches are similar to each other, but are not matched to each other, overlap.

FIG. 12 illustrates a simulation result in which scale pitch calculation accuracy is improved.

FIG. 13 is a conceptual diagram illustrating a process of extracting a beating signal generated by the method of measuring web feeding velocity according to the exemplary embodiment of the present invention as signal intensities corresponding to four phases for each pitch.

FIG. 15 is a conceptual diagram illustrating an example of a distorted Lissajous circle.

DETAILED DESCRIPTION OF THE EMBODIMENTS

Figure 1:
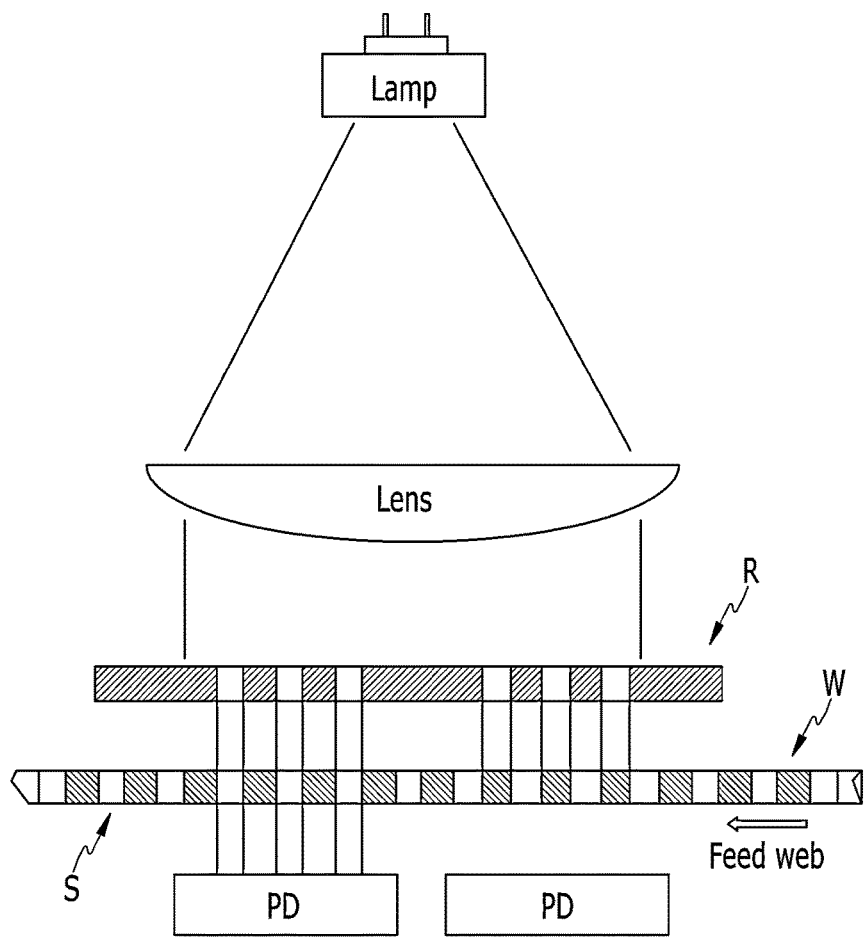
FIG. 1 is a conceptual diagram illustrating an apparatus for measuring web feeding velocity by using an encoder in the related art.
Figure 2:
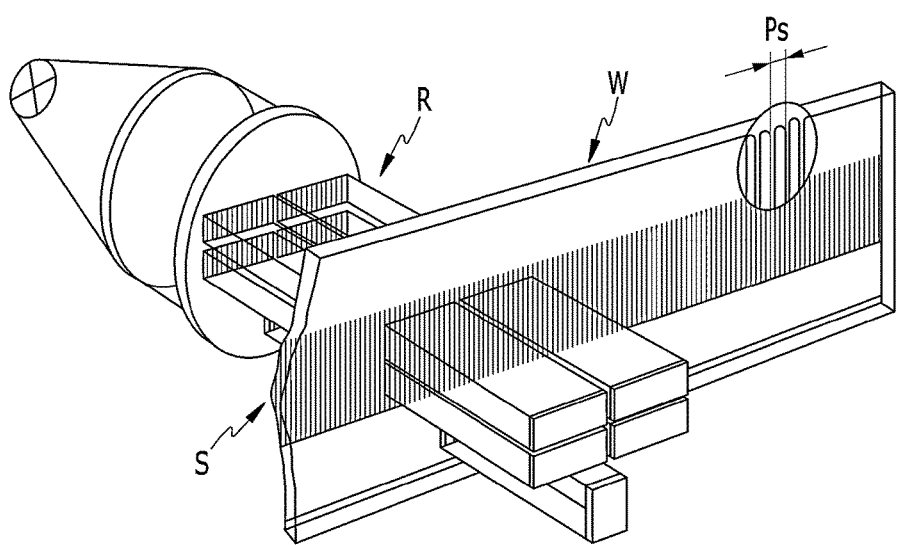
FIG. 2 is a conceptual view illustrating an apparatus for measuring web feeding velocity by using a 4-field encoder in the related art.

An object, specific advantages, and novel characteristics of the present invention will be more apparent from the detailed description and exemplary embodiments below in connection with the accompanying drawings. It should be noted that in giving reference numerals to elements of each drawing in the present specification, like reference numerals refer to like elements even though like elements are shown in different drawings. Further, terms such as "a first", a "second", "one surface", and "the other surface" are used for discriminating one constituent element from the other constituent element, but the constituent element is not limited by the terms. In the following description of the present invention, a detailed description of known arts incorporated herein is omitted to avoid making the subject matter of the present invention unclear.

Hereinafter, an exemplary embodiment of the present invention will be described in detail with reference to the accompanying drawings.

A method of measuring web feeding velocity according to an exemplary embodiment of the present invention uses a single field encoder, and an apparatus 100 of the present invention will be first described with reference to FIG. 3.

Figure 3:
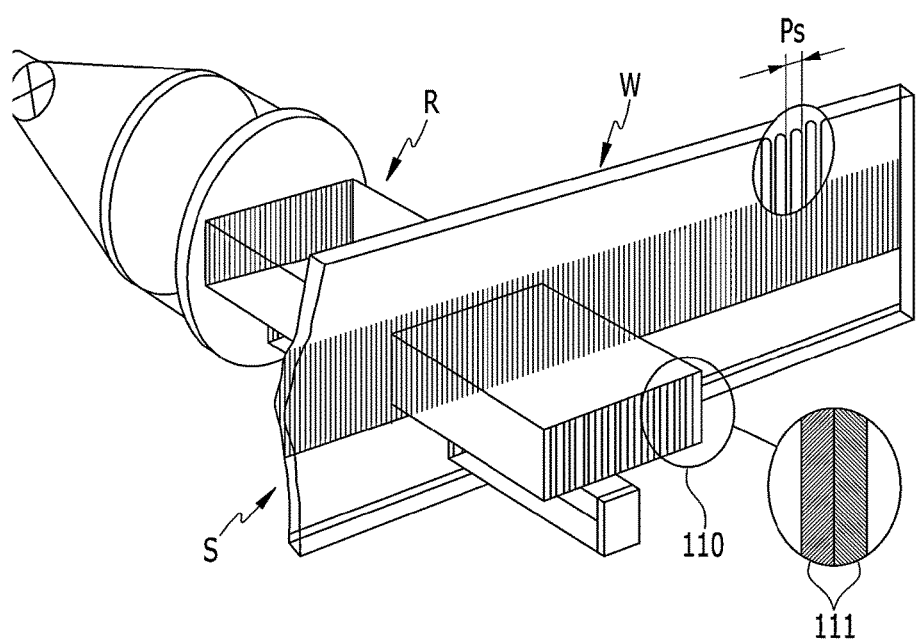
FIG. 3 is a conceptual diagram illustrating an apparatus for measuring web feeding velocity according to an exemplary embodiment of the present invention.

FIG. 3 is a conceptual diagram illustrating an apparatus for measuring web feeding velocity according to an exemplary embodiment of the present invention.

Referring to FIG. 3, in a web feeding velocity measuring apparatus 100 for measuring web feeding velocity according to an exemplary embodiment of the present invention, a scale is formed on a web W, and a mask R is formed on a reticle disposed at one side of the web W. In this case, a light source and a lens for providing collimated light are installed at the mask R side.

In the web feeding velocity measuring apparatus 100 for measuring the web feeding velocity according to the exemplary embodiment of the present invention, a single image sensor 110, in which a plurality of detection units 111 is integrated, detects light passing through the mask R and the scale S.

In this case, in the web feeding velocity measuring apparatus 100 for measuring the web feeding velocity according to the exemplary embodiment of the present invention, a pitch Pr of the mask R is different from a pitch Ps of the scale S.

That is, in the web feeding velocity measuring apparatus 100 for measuring the web feeding velocity according to the exemplary embodiment of the present invention, one image sensor 110 detects all light passing through the scale S, thereby obtaining a signal corresponding to a single field.

In the web feeding velocity measuring apparatus 100 for measuring the web feeding velocity according to the exemplary embodiment of the present invention, even if the pitch of the scale of the fed web is changed, the changed pitch of the scale influences all signals, so that when the pitch of the scale of the actually fed and changed web is calculated, it is possible to precisely measure the feeding velocity of the web.

Hereinafter, a method for measuring web feeding velocity according to an exemplary embodiment of the present invention will be described in detail.

Figure 4:
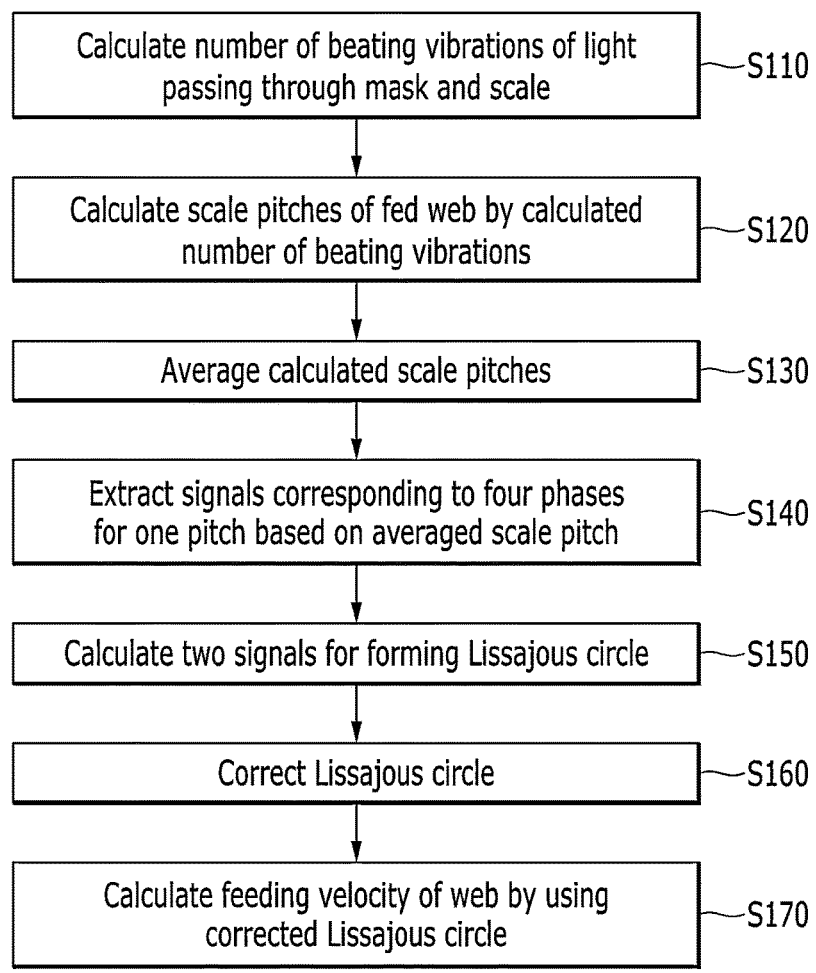
FIG. 4 is a flowchart illustrating a method of measuring feeding velocity of a web according to an exemplary embodiment of the present invention.

FIG. 4 is a flowchart illustrating a method of measuring web feeding velocity according to the exemplary embodiment of the present invention.

Referring to FIG. 4, in the method of measuring web feeding velocity according to the exemplary embodiment of the present invention, the number $f_b$ of vibrations of a moiré image of light passing through the mask R and the scale S is calculated (S110, hereinafter referred to as the first step).

In this case, according to the exemplary embodiment of the present invention, the pitch Pr of the mask R is different from the pitch Ps of the scale S, and in the light passing through slots having different pitches, intensive light (signal) and weak light (signal) are repeated with a uniform number of vibrations, and the number of vibrations is referred to as the number of vibrations of the moiré image. Here, the number of vibrations means the number of spatial vibrations of an image of light, which passes through two gratings to be projected on an image surface.

Figure 5:
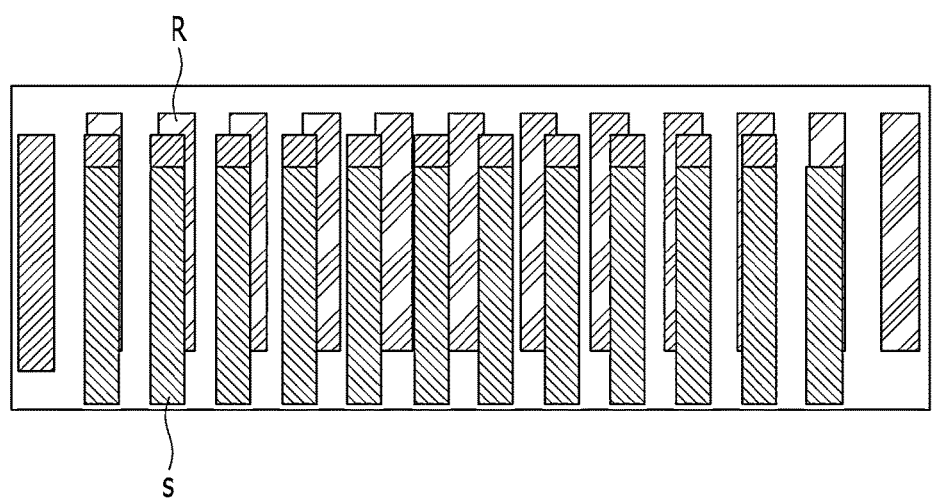
FIG. 5 is a conceptual diagram illustrating formation of a moiré image.

FIG. 5 is a conceptual diagram illustrating formation of a moiré image, and FIGS. 6 (a) and (b) are pictures of a formed moiré image viewed when gratings, of which pitches are similar to each other but are not matched with each other, overlap.

As illustrated in FIG. 5, when the pitches of the mask R and the scale S are different from each other, intensive light and weak light are repeated with the uniform number of vibrations as illustrated in FIG. 6. In this case, as the pitches of the two gratings are similar to each other, the pitch of the moiré image is relatively increased.

In this case, in order to calculate the number $f_b$ of vibrations of the moiré image in the first step (S110), only a component of the number of low band vibrations is extracted from the signals (that is, the beating signals) generated by the image sensor 110, and then the number of vibrations $f_b$ of the moiré image may be calculated by the extracted component of the number of low band vibrations.

Figure 7:
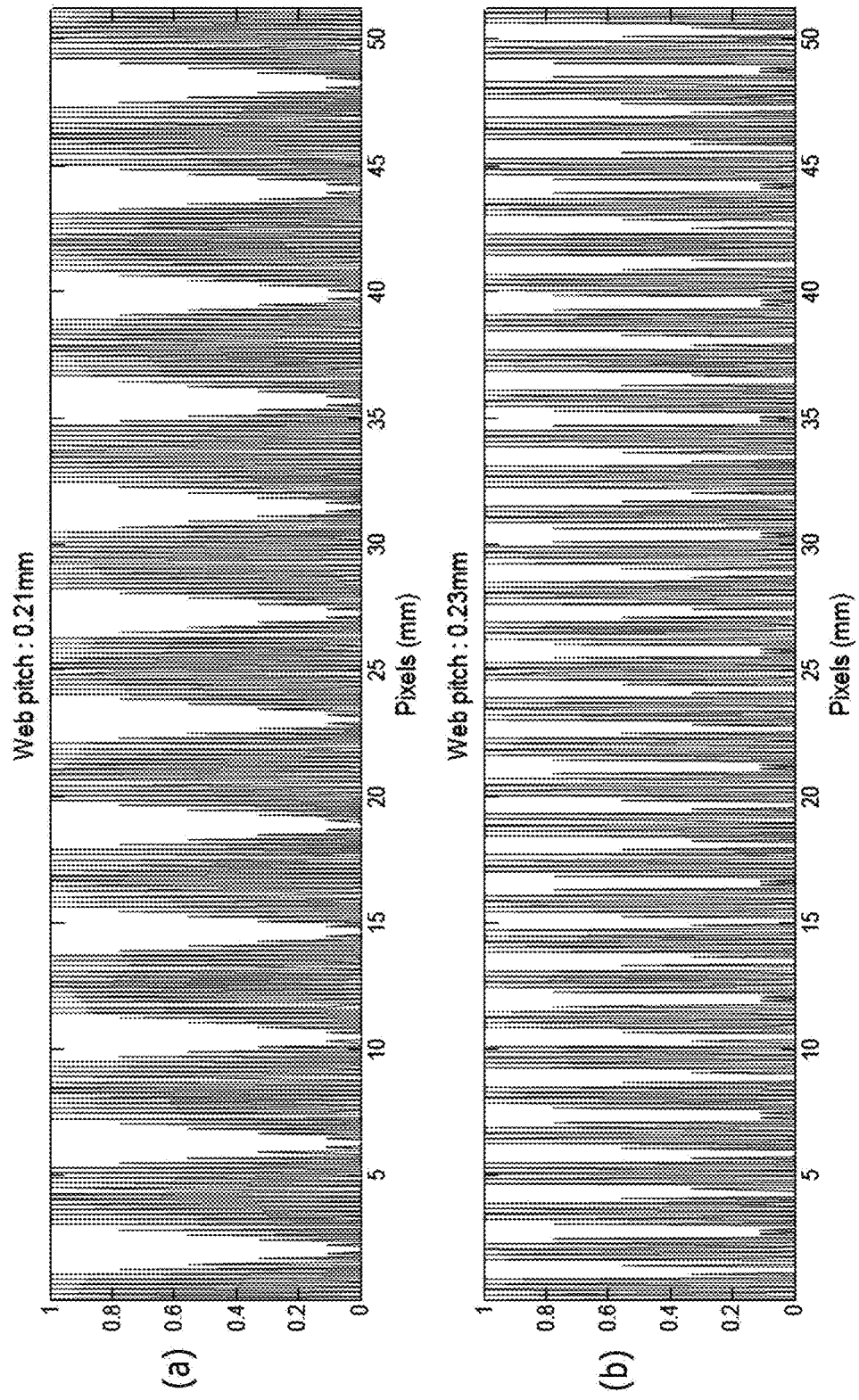
FIGS. 7 (a) and (b) are graphs illustrating a signal obtained by an image sensor of the apparatus for measuring web feeding velocity according to the exemplary embodiment of the present invention.
Figure 8:
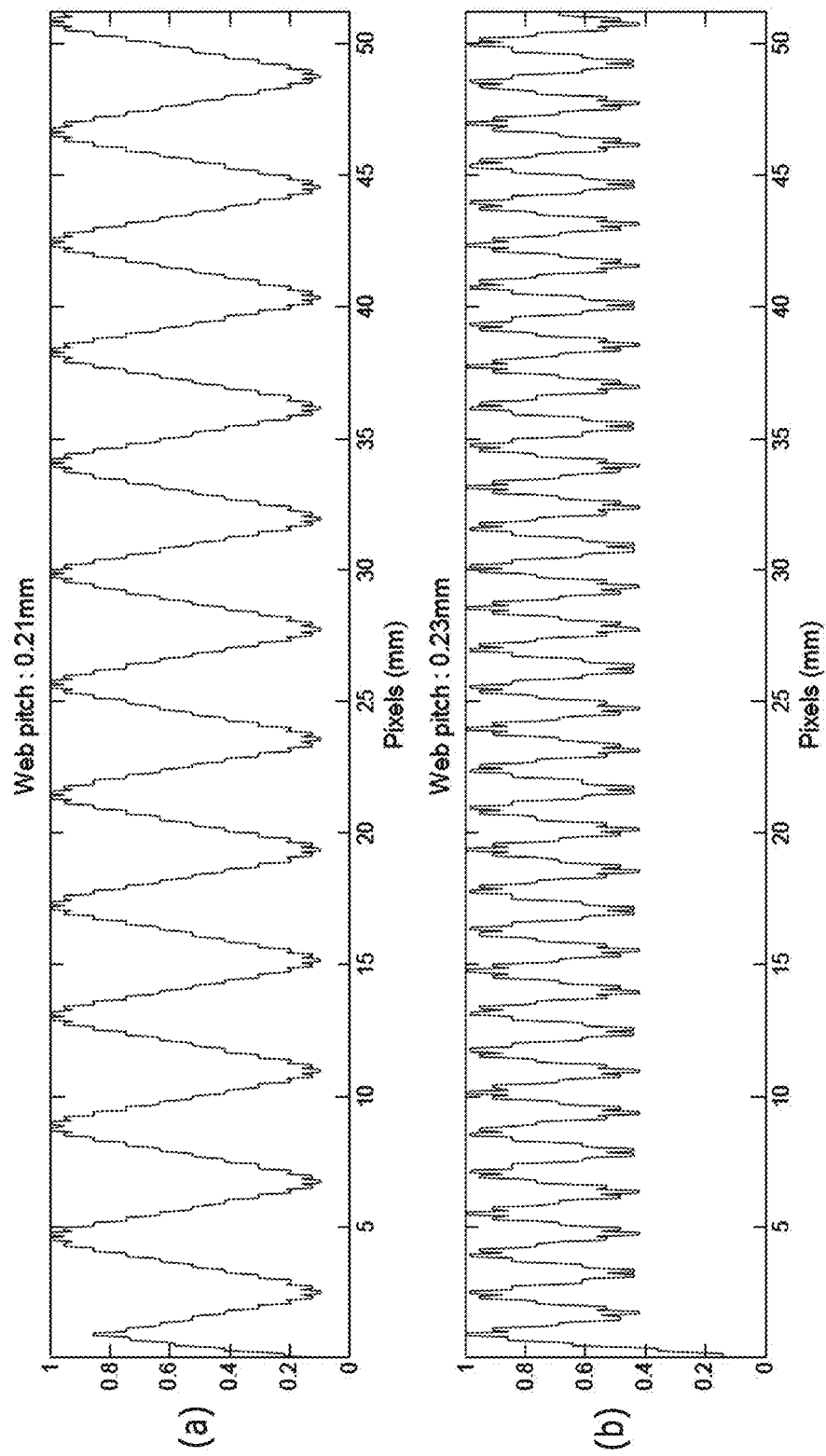
FIGS. 8 (a) and (b) are graphs illustrating extraction of only a low band frequency component by allowing a signal illustrated in FIG. 6 to pass through a low pass filter.

FIGS. 7 (a) and (b) are graphs illustrating a signal obtained by the image sensor of the apparatus for measuring web feeding velocity according to the exemplary embodiment of the present invention, and FIGS. 8 (a) and (b) are graphs illustrating extraction of only a low band frequency component by allowing the signal illustrated in FIG. 6 to pass through a low pass filter. In this case, the pitch of the web is 0.21 mm in the graphs of FIGS. 7 (a) and 8 (a), and the pitch of the web is 0.23 mm in the graphs of FIGS. 7 (b) and 8 (b).

According to the exemplary embodiment of the present invention, only the component of the number of low band vibrations may be extracted as illustrated in FIG. 8 from the signals generated by the image sensor 110 as illustrated in FIG. 7 through a low pass filter.

As illustrated in FIG. 8, the number $f_b$ of vibrations of the moiré image may be calculated by directly performing frequency analysis (fast Fourier transform (FFT)) on the extracted component of the number of low band vibrations.

The frequency analysis (FFT) used in the method of measuring the web feeding velocity according to the exemplary embodiment of the present invention is a widely known calculation method, so a detailed description thereof will be omitted.

Figure 9:
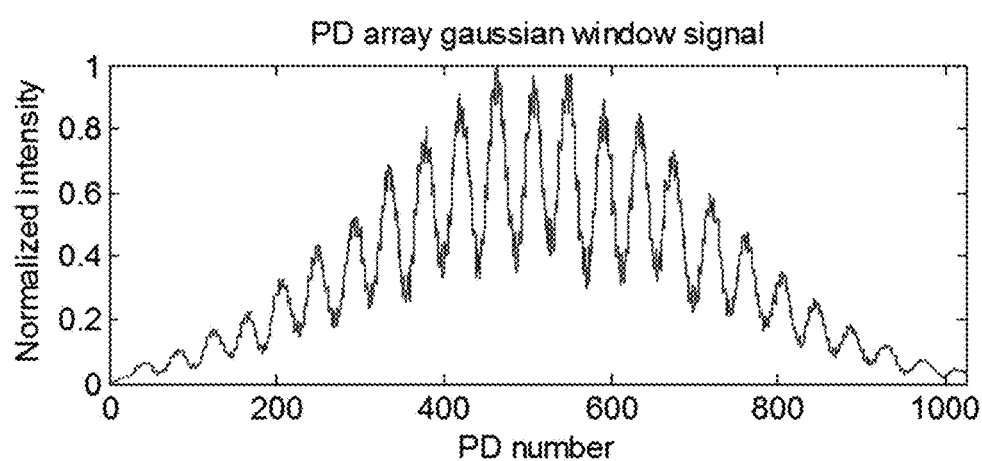
FIG. 9 is a graph illustrating an example of a process of processing light quantity signals obtained in a photodetector array of the image sensor, and indicates a signal after application of a Gaussian window. An x-axis in the graph of FIG. 9 indicates a photodetector array order within the image sensor.
Figure 10:
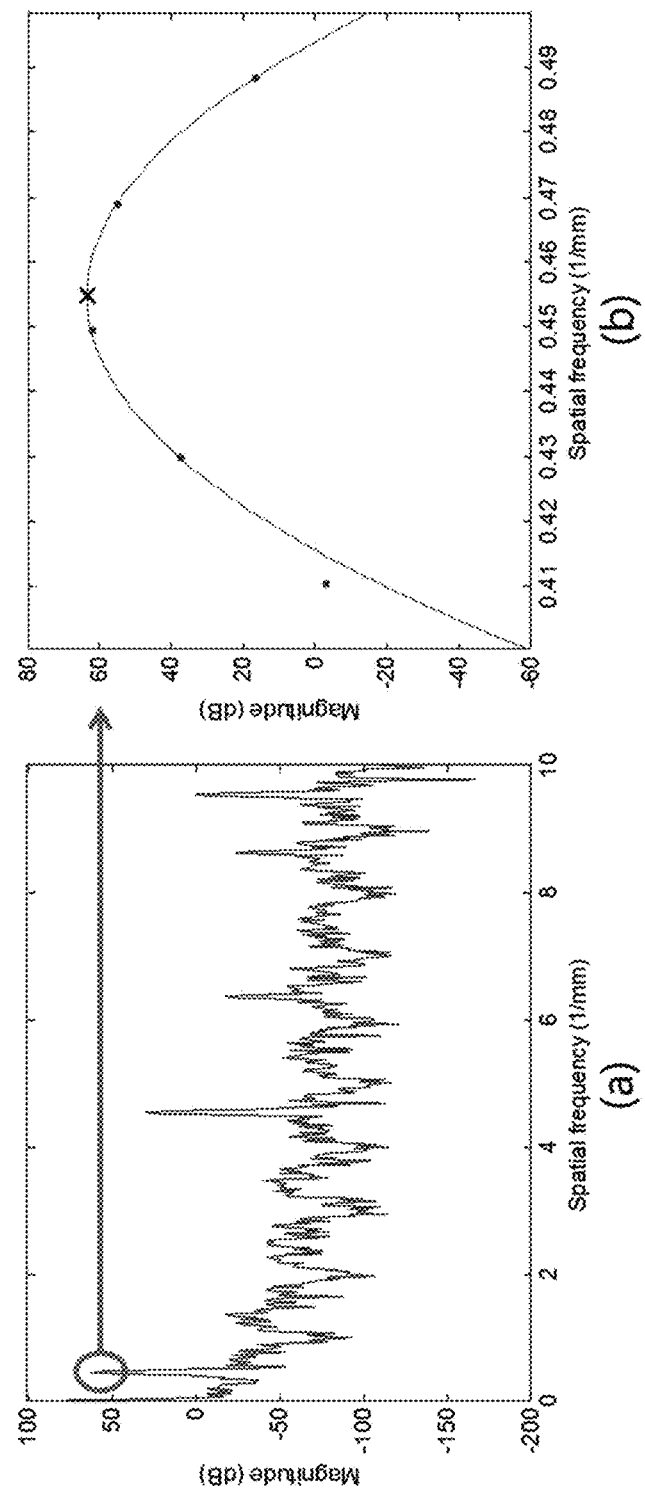
FIGS. 10 (a) and (b) are graphs illustrating calculation of a pitch by performing FFT on graph of FIG. 9, and are graphs illustrating a method of applying a Gaussian window and a second order polynomial regression method in a log scale in order to improve detection accuracy of a moiré image vibration number component in the FFT. In this case, FIG. 10 (a) is a graph of an FFT-processed measurement signal to which the Gaussian window suggested in FIG. 9 is applied, and FIG. 10 (b) is a graph illustrating application of second order polynomial regression in order to increase accuracy of calculating the number of vibrations of the moiré image.

In the meantime, as illustrated in FIG. 9, in order to improve accuracy of the calculation of the number of vibrations of the moiré image, a method adopting the Gaussian window and the second order polynomial regression method in a log scale may also be adopted. In order to improve accuracy of the calculation of the number of vibrations of the moiré image, the Gaussian window and parabolic fitting in the log scale, which are suggested in the thesis "Improving FFT Frequency Measurement Resolution by Parabolic and Gaussian Spectrum Interpolation" published by the Conseil European pour la Recherché Nucleaire held in Geneva, Switzerland on May, 2004, may be used. FIG. 10 (a) is a graph of an FFT-processed measurement signal to which the Gaussian window suggested in FIG. 9 is applied, and FIG. 10 (b) is a graph illustrating application of the second order polynomial regression in order to increase accuracy of the calculation of the number of vibrations of the moiré image.

Figure 11:
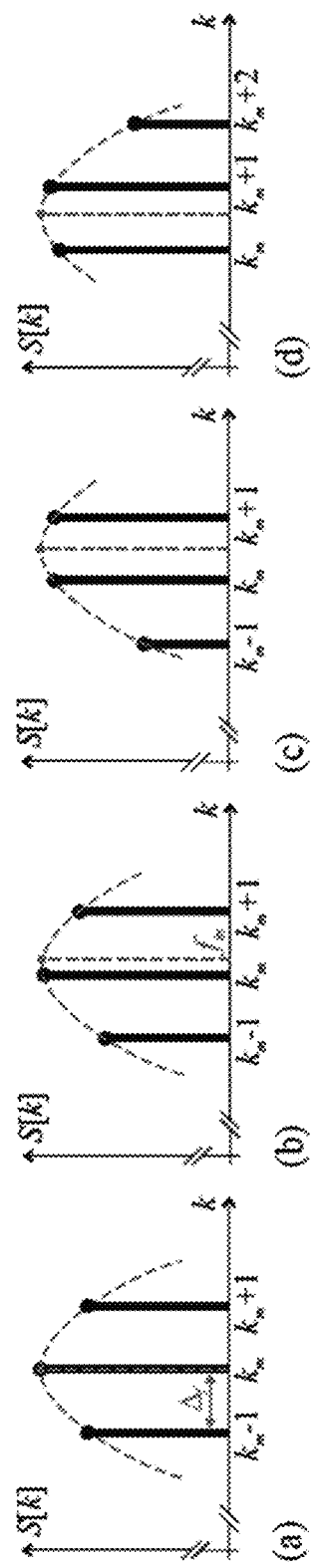
FIG. 11 (a) to (d) are graphs illustrating a concept of a method of improving accuracy of FFT-based calculation of the number of vibrations by using the second order polynomial regression method in the case where the vicinity of a maximum value has a quadratic function in order to calculate the number of vibrations of the moiré image.

FIG. 11 (a) to (d) are graphs illustrating a concept of a method of improving accuracy of FFT-based calculation of the number of vibrations by using the second order polynomial regression method in the case where the vicinity of a maximum value has a quadratic function in order to calculate the number of vibrations of the moiré image. When the Gaussian window is applied, shapes of the number of vibrations of each peak on the FFT theoretically show a shape of a quadratic function, so that, referring to FIG. 11 (a) to (d), FIG. 11 (a) illustrates the case where a bin limited to FFT resolution is accidently matched with a spectral peak, but FIG. 11 (b) to (d) show a process in which an error is inevitably generated by a limitation of the FFT resolution. Even in the cases of FIG. 11 (b) to (d), when the second order polynomial regression is used by using three bins in the vicinity of a given maximum value, the number of vibrations of the moiré image may be precisely calculated without the limitation of the FFT resolution on the spectral peak.

In this case, minimum resolution of a frequency domain of the FFT is inversely proportional to a length (that is, a sampling length L) of an image sensor array as illustrated in Equation 1 below.

$$\Delta_f = 1/L \qquad \text{(Equation 1)}$$

For example, in the present specification, the sampling length is a length of the image sensor array, and when it is assumed that the sampling length is 51.2 mm, minimum resolution of the number of vibrations of the moiré image obtainable in the case where interpolation is not performed may be $1/51.2$ mm=0.0195 mm$^{-1}$.

In Equation 2 below, when an error ($\Delta f_b$) of $f_b$ (the number of vibrations of the moiré image) is reflected, an error of $f_s$ (a spatial frequency of a scale grating) may be induced as described below, and a generable maximum scale pitch error may be induced by using the induced error of $f_s$ as expressed in Equation 3 ("$\Delta P_{s,max}$" is a maximum error generable in the scale pitch calculation, and "$\Delta f_{b max}$" is a maximum error of 0.0195 mm$^{-1}$ generable in the calculation of the number of vibrations of the moiré image).

$$f_s = f_r - (f_b - \Delta f_b) \qquad \text{(Equation 2)}$$

$$\Delta P_{s,max} = P_s - 1/(f_r - f_b - \Delta f_{b,max})| \qquad \text{(Equation 3)}$$

When $P_s$ is 220 μm and $P_r$ is 200 μm, "$\Delta P_{s,max}$" is 0.95 μm, which is 4.3% of the pitch of the scale, and means that final position measurement accuracy inevitably has an error of 4.3% or more, thereby significantly influencing accuracy.

FIG. 12 illustrates a simulation result in which scale pitch calculation accuracy is improved.

As can be seen in FIG. 12, in order to improve accuracy of the detection of the spectral peak, interpolation using the bins configured at an interval "$\Delta_f$" is necessary, and as one accurately knows a form of a function of a peak shape in an FFT plot, it is advantageous to accurately detect the peak during the interpolation. To this end, when the FFT target signal is subjected to the Gaussian window processing, and then to the FFT, the shape of each spectral peak is expressed by a parabolic function, so that when parabolic fitting is performed by using data of three bins around the peak, it is possible to precisely detect the spectral peak.

After the number $f_b$ of vibrations of the moiré image is calculated by the aforementioned first step (S110), a scale pitch $P_s$ of the fed web W based on the calculated number $f_b$ of vibrations of the moiré image is calculated in (second step S120).

To this end, after the number $f_s$ of vibrations of the scale is calculated by Equation 4 below, the scale pitch $P_s$ is calculated by using the calculated number $f_s$ of vibrations of the scale.

$$f_s = f_r - f_b \qquad \text{(Equation 4)}$$

Here, $f_s$ is the number of vibrations of the scale, $f_r$ is the number (known value) of vibrations of the mask, and $f_b$ is the number of vibrations of the moiré image. Equation 4 is the case where the interval of the grating of the mask is larger than that of the grating of the scale, and in the opposed case, a sign may be changed to "+" to be applied.

When the number $f_s$ of vibrations of the scale is calculated by the aforementioned method, and then a reciprocal number is applied, it is possible to calculate the scale pitch $P_s$.

When the scale pitch $P_s$ is calculated by the aforementioned method, signal intensities corresponding to four phases may be extracted based on the calculated scale pitch $P_s$ to form a Lissajous circle as illustrated in FIG. 13, and then it is possible to finally calculate feeding velocity of the web by the formed Lissajous circle.

FIG. 13 is a conceptual diagram illustrating a process of extracting the beating signals generated by the method of measuring web feeding velocity according to the exemplary embodiment of the present invention as signal intensities corresponding to four phases for each pitch.

That is, as illustrated in FIG. 13, signal intensities, that is, $I_0,i$, $I_{90},i$, $I_{180},i$, and $I_{270},i$, for the four phases, such as 0°, 90°, 180°, and 270°, are calculated based on an $i^{th}$ pitch, and then $I_O$, $I_{90}$, $I_{180}$, and $I_{270}$ are calculated by averaging all calculated signal intensities.

Then, two signals, that is $\overline{u_1}(=I_0-I_{180})$ and $\overline{u_2}(=I_{90}-I_{270})$, for forming the Lissajous circle are calculated.

In this case, it is possible to calculate an angle θ at a specific point of the Lissajous circle by the two signals, it is possible to calculate a distance (see Equation 5 below) of the web by the angle θ, and finally, it is possible to calculate the velocity of the web by differentiating the distance of the web (see Equation 6 below).

Moving distance of web=$Ps\times\theta/2\pi$ (Equation 5)

Ps is the scale pitch.

Velocity of Web=$P_s\times\omega/2\pi$ (Equation 6)

ω is time differentiation of θ

In the meantime, the method of calculating the moving distance and the velocity of the web by Equations 5 and 6 is widely known, so that a detailed description thereof will be omitted.

However, since the scale pitch $P_s$ calculated by the aforementioned method has a slightly different value for each measurement timing, an error is generated in the calculated feeding velocity of the web.

That is, as is widely known, the angle θ necessary for calculating the velocity of the web by the Lissajous circle is an angle between signals corresponding to adjacent time zones, and in this case, as variation in the scale pitch $P_s$ corresponding to each signal is small, the feeding velocity is accurately calculated.

However, the exemplary embodiment of the present invention is implemented on an assumption that a change in the pitch between the adjacent timing is small enough to be ignorable, and when there is a difference in the scale pitch for each timing as described above, it is difficult to accurately calculate the feeding velocity, so that the pitch $P_s$ is averaged so as to minimize the change in the pitch between the adjacent timing in the calculated scale pitch $P_s$ (S130, hereinafter referred to as the third step).

To this end, in the third step (S130), an averaged scale pitch Ps,k,mean may be calculated by calculating an average of a pitch at a specific time and a pitch in the vicinity of the pitch at the specific time.

Figure 14A:
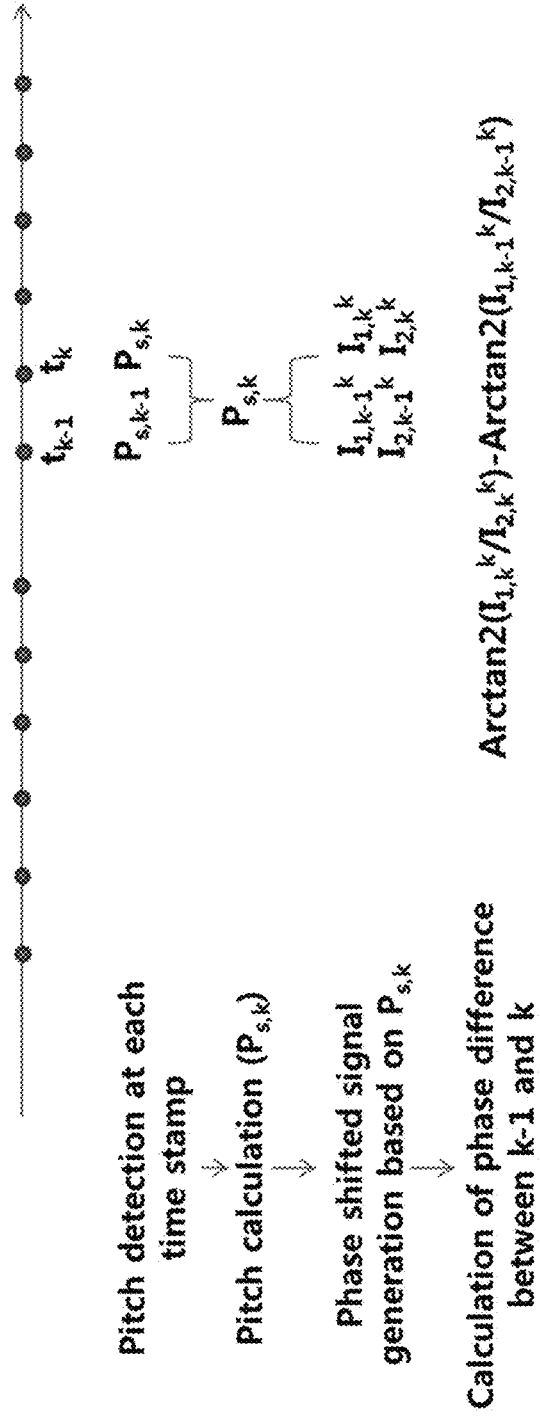
FIGS. 14 (a) and (b) are conceptual diagrams illustrating a signal processing process. In this case, FIG. 14 (a) illustrates the case where two signals are averaged, and FIG. 14 (b) illustrates the case where n signals are averaged.

FIG. 14 is a conceptual diagram illustrating the aforementioned signal processing process.

As illustrated in FIG. 14, in order to average the scale pitch $P_s$,k at a specific time k, the scale pitch may be averaged by using pitches Ps,k−n+1 to Ps,k−1 at a plurality of time before the time k.

For example, the averaged scale pitch $P_s$,k,mean may be obtained by processing the pitch at the precedent time by using a least squares method.

The averaged scale pitch $P_s$,k,mean may also be obtained by an arithmetic average of the pitches of the precedent time as a matter of course. Otherwise, a pitch at a specific time may be selected, and the selected pitch may be used as the averaged scale pitch.

Signals corresponding to a plurality of phases, for example, the four phases, for one pitch are extracted based on the aforementioned averaged scale pitch Ps,k,mean (S140, hereinafter referred to as the fourth step), and then a plurality of signals, for example, two signals, for forming the Lissajous circle, are calculated (S150, hereinafter referred to as the fifth step).

As described above, signal intensities corresponding to the four phases (0°, 90°, 180°, and 270°) for one pitch of the moiré image are extracted based on the averaged scale pitch $P_s$,k,mean, and then are averaged (see Equation 7 below).

$\overline{u_1}=I_0-I_{180}$ $\overline{u_2}=I_{90}-I_{270}$ [Equation 7]

Herein, $I_0$: an intensity of signal at a phase of 0°, $I_{90}$: an intensity of signal at a phase of 90°, $I_{180}$: an intensity of signal at a phase of 180°, and $I_{270}$: an intensity of signal at a phase of 270°.

In the meantime, the Lissajous circle may be formed by the calculated $\overline{u_1}$ and $\overline{u_2}$, and it is general that the actually induced Lissajous circle is not shown in an ideal circular shape, but is shown in a partially distorted form due to several errors as illustrated in FIG. 15. FIG. 15 illustrates an example of the distorted Lissajous circle.

Since when the distorted Lissajous circle is used, it is difficult to accurately calculate the velocity. Accordingly, two signals $\overline{u_1}$ and $\overline{u_2}$ for forming the Lissajous circle may be calculated, and then the Lissajous circle may be corrected by correcting the calculated two signals $\overline{u_1}$ and $\overline{u_2}$ (S160, hereinafter referred to as the sixth step).

The correction of the Lissajous circle may adopt a widely known algorithm, and particularly, is described in the thesis as the related art literature in detail, so a detailed description thereof will be omitted.

Further, the aforementioned calculation may be performed by a widely known calculation unit (a computer and the like), and is also a widely known configuration, so a detailed description thereof will be omitted.

The aforementioned method of the present invention will be described again based on data on which the method is actually performed.

Figure 16:
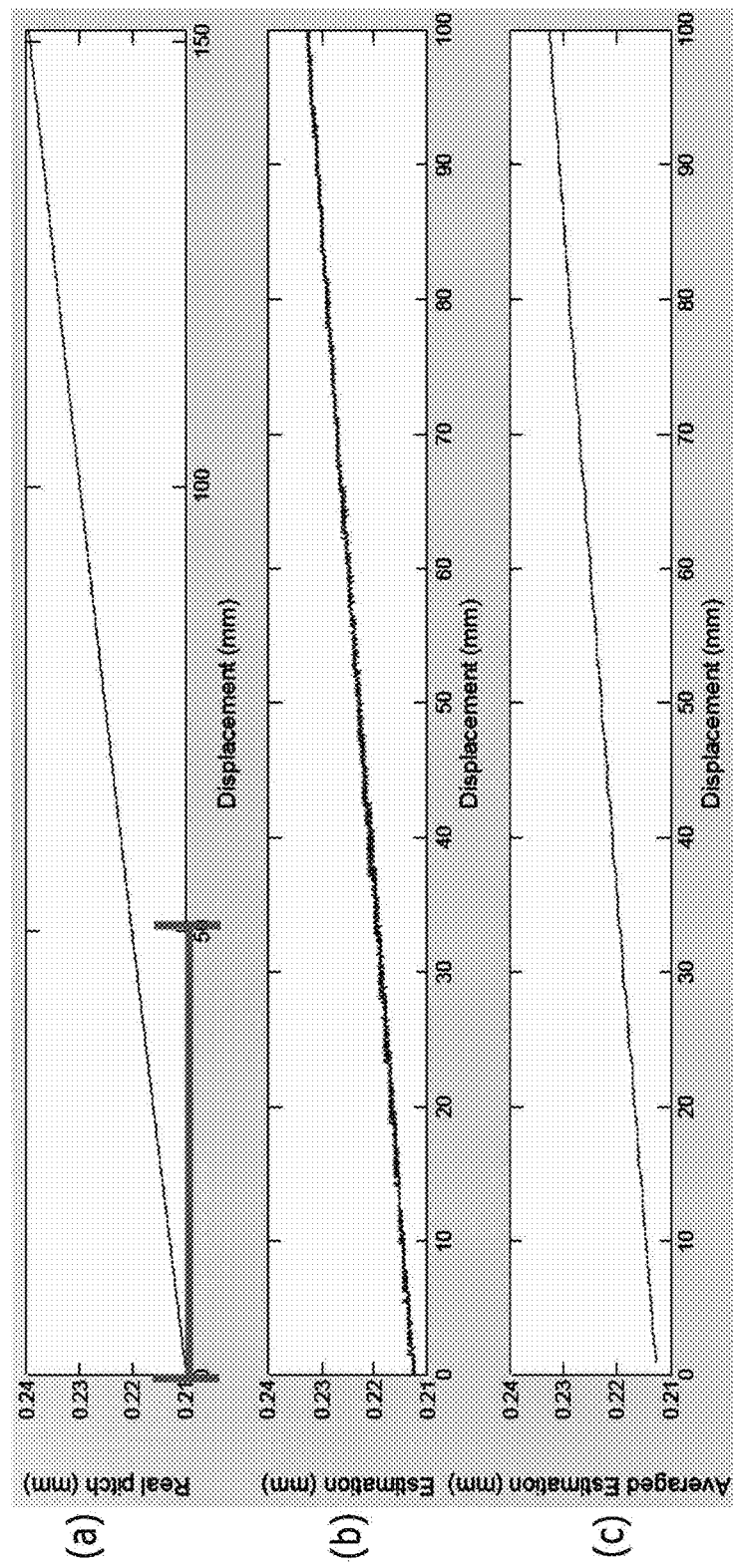
FIG. 16 (a) to (c) are graphs illustrating a pitch calculated by the method of measuring web feeding velocity according to the exemplary embodiment of the present invention.

FIG. 16 (a) to (c) illustrate the calculation of scale pitches in the case where the pitch is gradually increased, and the graph of FIG. 16 (a) illustrates a change in a pitch for actual movement displacement, the graph of FIG. 16 (b) illustrates the scale pitch $P_s$ calculated by the exemplary embodiment of the present invention, which is a value before the correction, and the graph of FIG. 16 (c) illustrates the corrected scale pitch, which is obtained by arithmetically averaging and correcting pitches including the precedent 19 pitches.

As illustrated in FIGS. 16 (a) to (c), it can be seen that the scale pitch before the averaging is not matched to a tendency of the actually increasing pitch, but the scale pitch after the averaging stably follows the tendency of the actually increasing pitch, which means that an effect of an MA filter is generated through the average.

In this case, there is no graph at a left-side end of the graph of FIG. 16 (c) because the scale pitch is calculated by averaging the precedent 20 signals.

Figure 17:
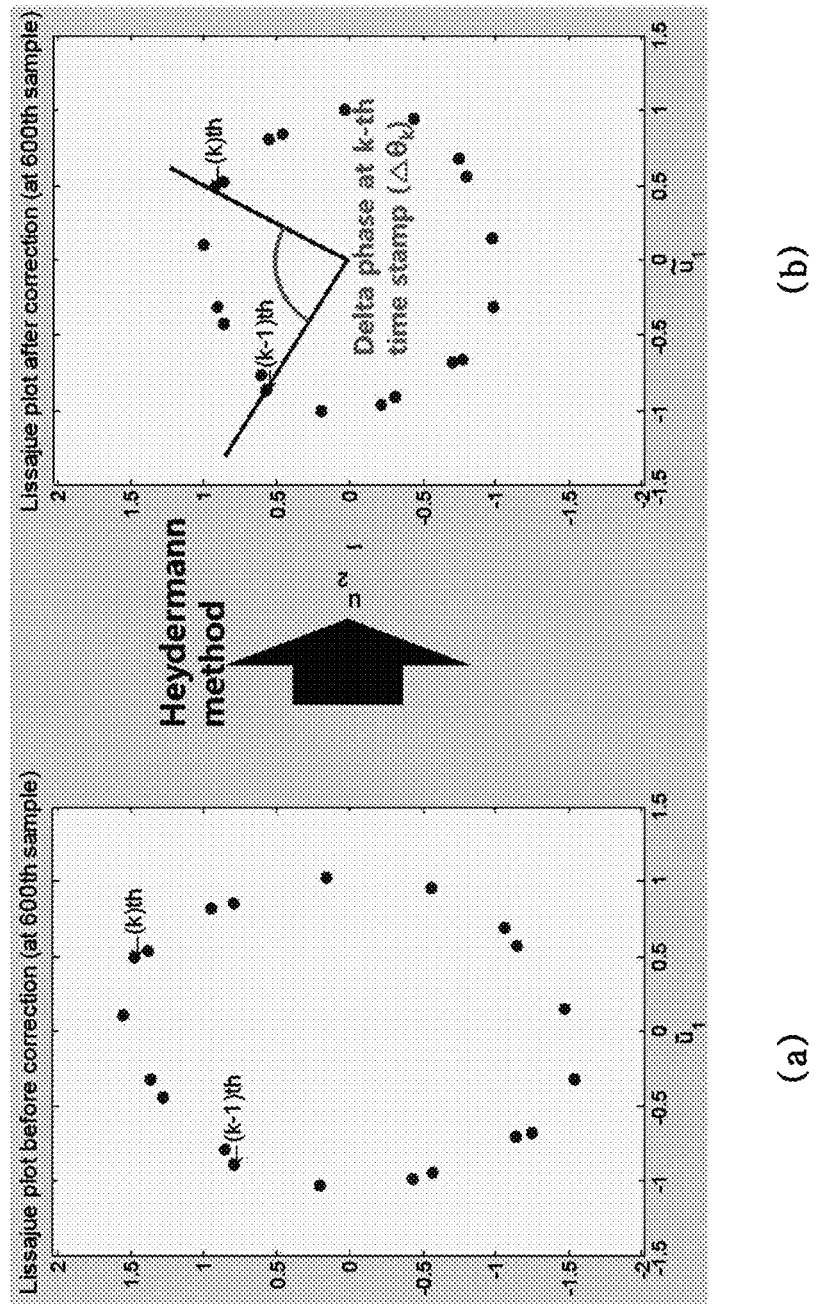
FIGS. 17 (a) and (b) are graphs illustrating a calculated Lissajous circle and a Lissajous circle corrected by the method of measuring web feeding velocity according to the exemplary embodiment of the present invention.
Figure 18:
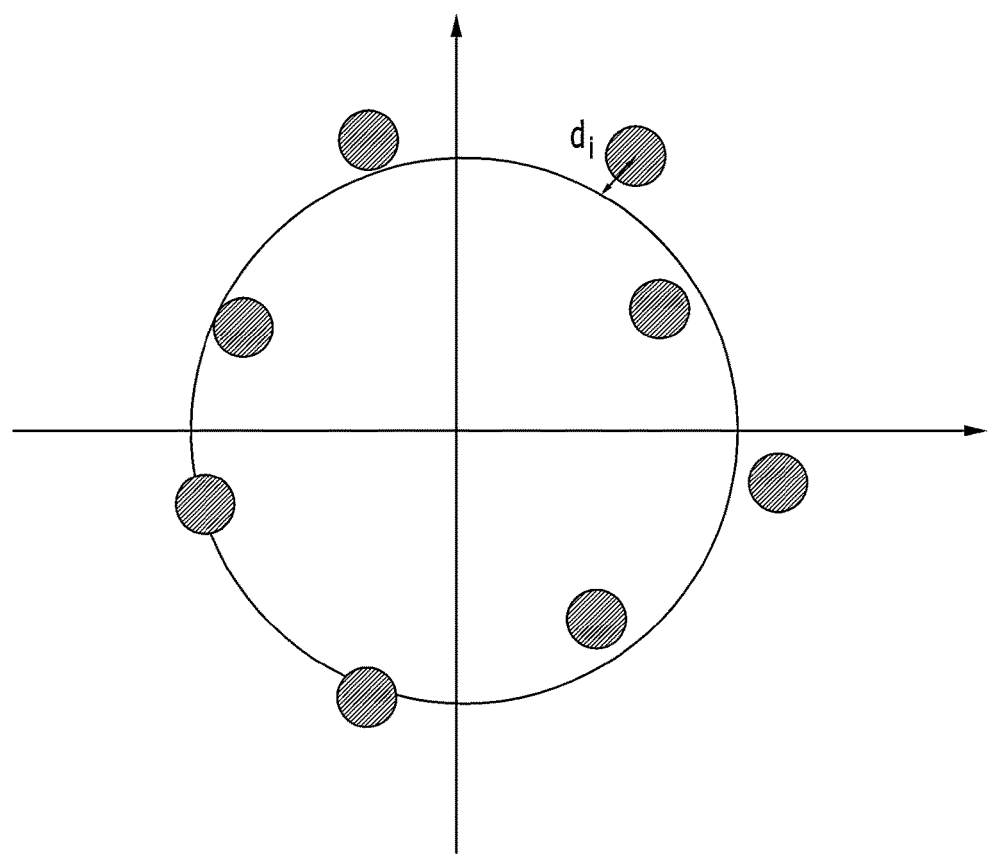
FIG. 18 is a conceptual diagram illustrating SQ for checking signal quality.

In the meantime, as described above, the Lissajous circle illustrated in the graph of FIG. 17 (a) may be formed by the corrected scale pitch, and the Lissajous circle is slightly distorted by various errors as described above, so that the angle between specific points may be calculated by correcting the distorted Lissajous circle to solve the distorted portion as illustrated in the graph of FIGS. 17 (b), thereby more accurately calculating the feeding velocity.

That is, the feeding velocity of the web may be calculated by calculating the angle of the Lissajous circle corrected by the aforementioned two signals and then using the calculated angle (S170, hereinafter referred to as the seventh step).

In the meantime, as described above, in order to check quality of a signal at each time, the Lissajous circle may be corrected, and then SQ may be calculated by Equation 8 below (see FIG. 17).

$$SQ = 1 - \sum_{i=1}^{n_p,ave} \frac{d_i}{n_p, ave}$$ [Equation 8]

$d_i$: distance to a circle having a radius of 1 at a point corresponding to a signal after the correction of the Lissajous circle, $n_p$,ave: the number of signals That is, the SQ is an average distance between the corrected Lissajous circle and unit circles having a radius of 1 at points of the respective signals, and as a value of the SQ closes to 1, that is, a value of d is small, the signal may be considered to be normal.

In this case, when the SQ has a value equal to or smaller than a predetermined threshold vale, it is not considered that the signal is normal, so that a current measurement value may be ignored and a measurement value of a previous time zone may be used.

Particularly, when the SQ has a value that is equal to or smaller than an ideal threshold value at a specific time, it may be determined that the apparatus for measuring the feeding velocity of the web has a problem.

Figure 19:
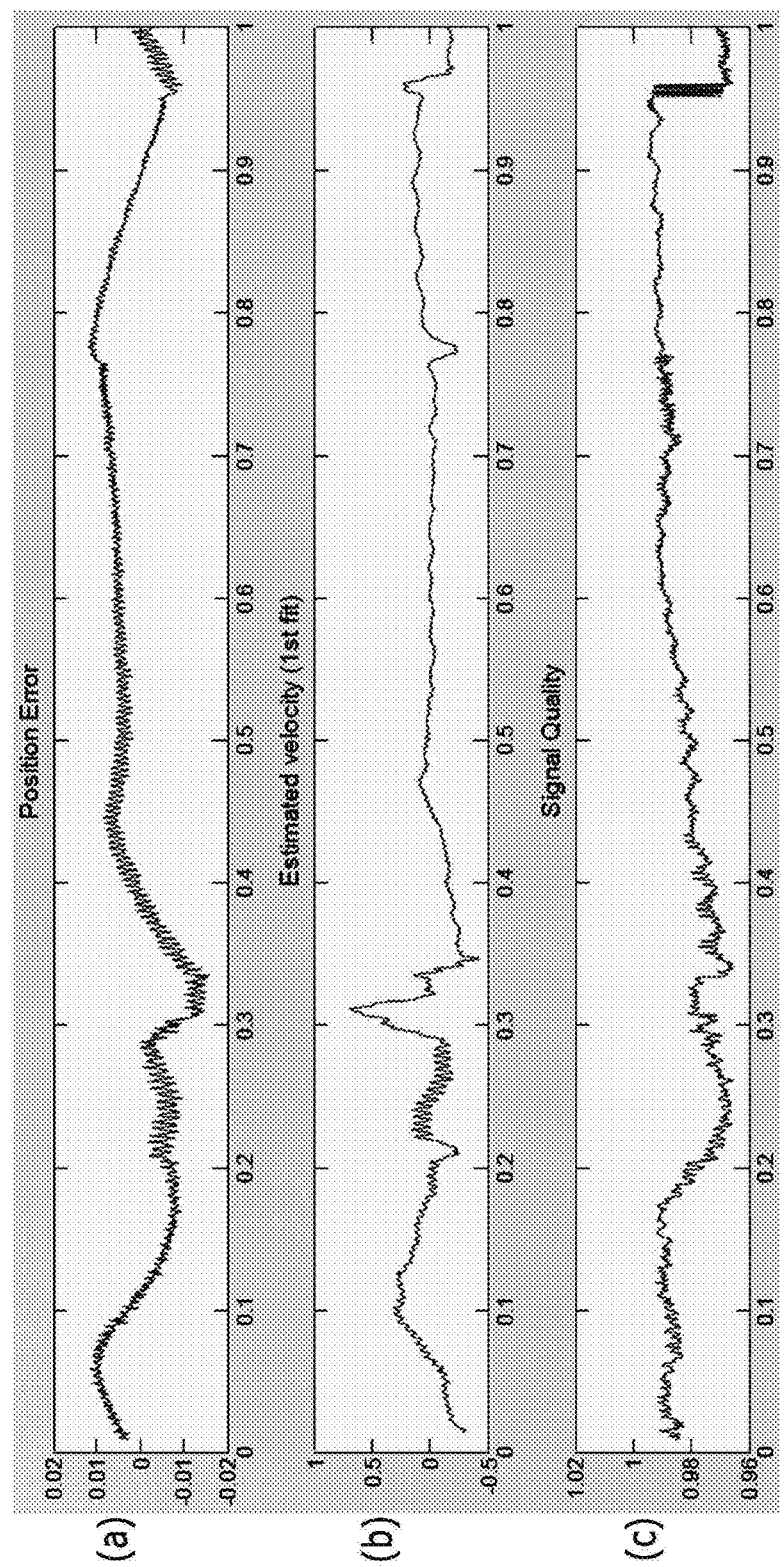
FIGS. 19 to 22 are graphs illustrating velocity and SQ calculated by the method of measuring web feeding velocity according to the exemplary embodiment of the present invention.
Figure 20:
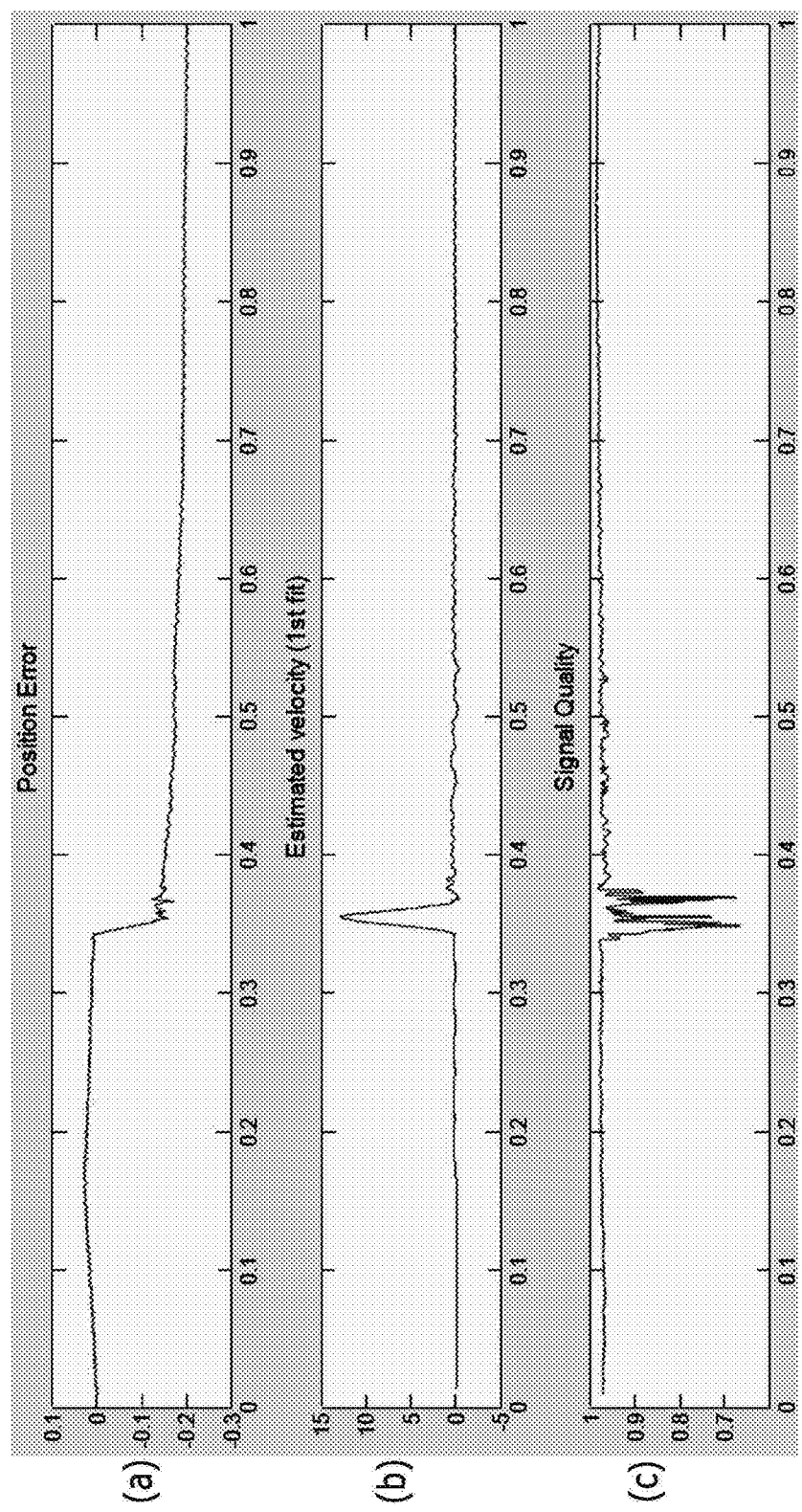

In the meantime, FIGS. 19 and 20 illustrate the case where the feeding velocity and the SQ are calculated by the aforementioned invention under the condition where the feeding velocity of the web is 100 mm/s and there is no input of an error source, FIG. 19 illustrates the case where the change in the pitch is slow but the pitch is randomly changed, and FIG. 20 illustrates the case where the pitch is sharply changed.

As illustrated in the graph of FIGS. 19 (a), it can be seen that the measured position error is equal to or smaller than 1%, which exhibits an excellent measurement result, and thus a velocity error is within a considerably small range. Further, as illustrated in the graph of FIGS. 19 (a), it can be seen that the SQ moves within approximately 0.98, so that a signal may be stably obtained.

However, FIG. 20 (a) to (c) illustrate the cases having the sharp pitch change, and there are points at which the position error, the velocity error, and the value of the SQ are sharply changed due to the sharp pitch change as illustrated, so that it may be considered that reliability is slightly decreased.

That is, as described above, the method of measuring the web feeding velocity according to the exemplary embodiment of the present invention is implemented under an assumption that the change in the pitch between the adjacent timing is small enough to be ignorable, and as described above, when there is a difference in the scale pitch for each timing, it is difficult to accurately calculate the feeding velocity, so that the pitch $P_s$ is averaged so as to minimize the change in the pitch between the adjacent timing in the calculated scale pitch $P_s$.

Accordingly, accuracy may be improved by decreasing noise during detection (estimation) of the pitch according to an effect of the application of the MA filter, but as described above, when the sharp change in the pitch is actually accompanied, there is a disadvantage in that accuracy of the measurement deteriorates.

In order to solve the disadvantage, in the case where there is a point at which the calculated feeding velocity of the web and the like is sharply changed, it is possible to obtain an accurate measurement result by receiving a signal from each of before and after the point at which the calculated feeding velocity of the web is sharply changed, and then selectively using data having high SQ by providing a plurality of image sensors, for example, by using a dual sensor.

Figure 21:
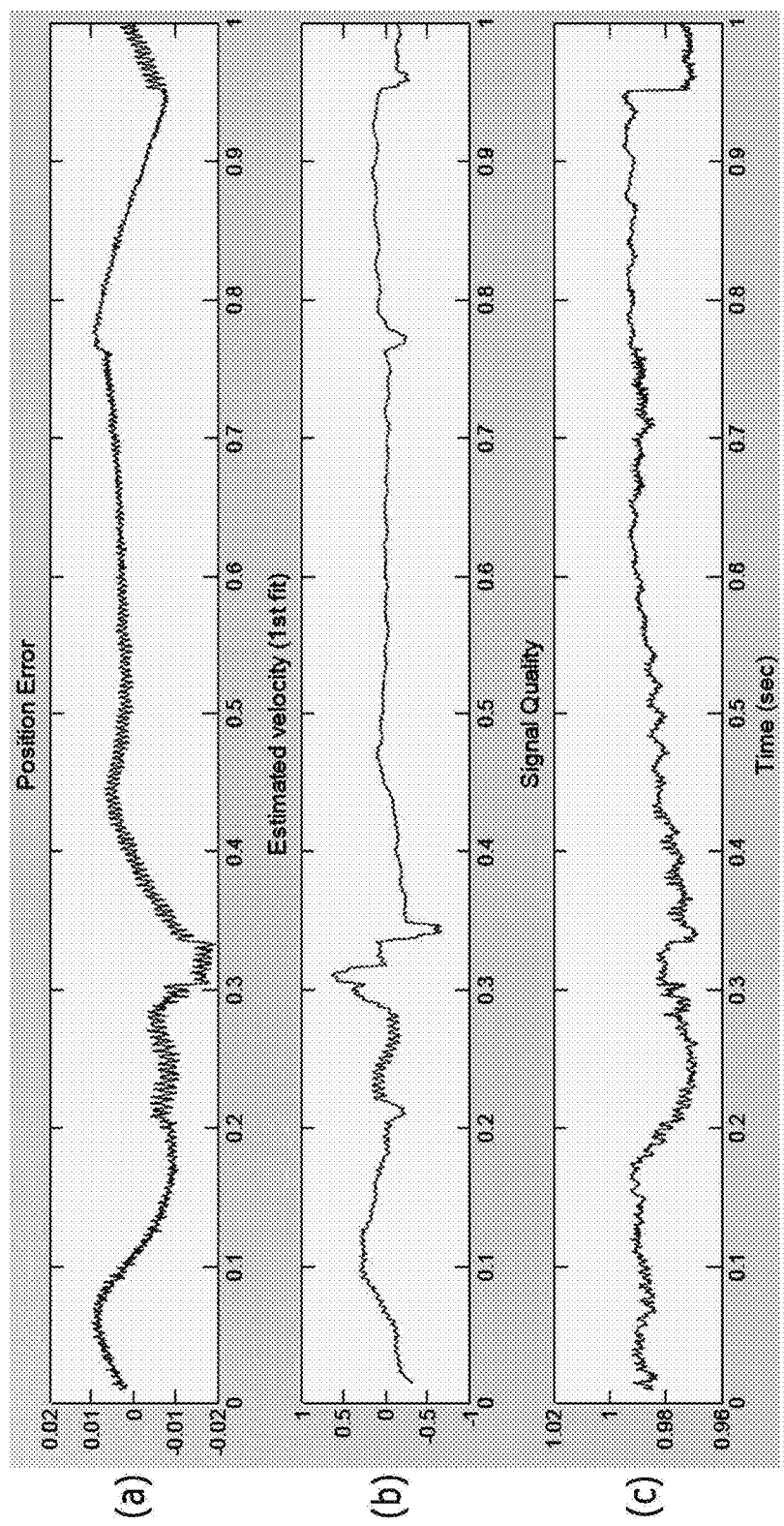
Figure 22:
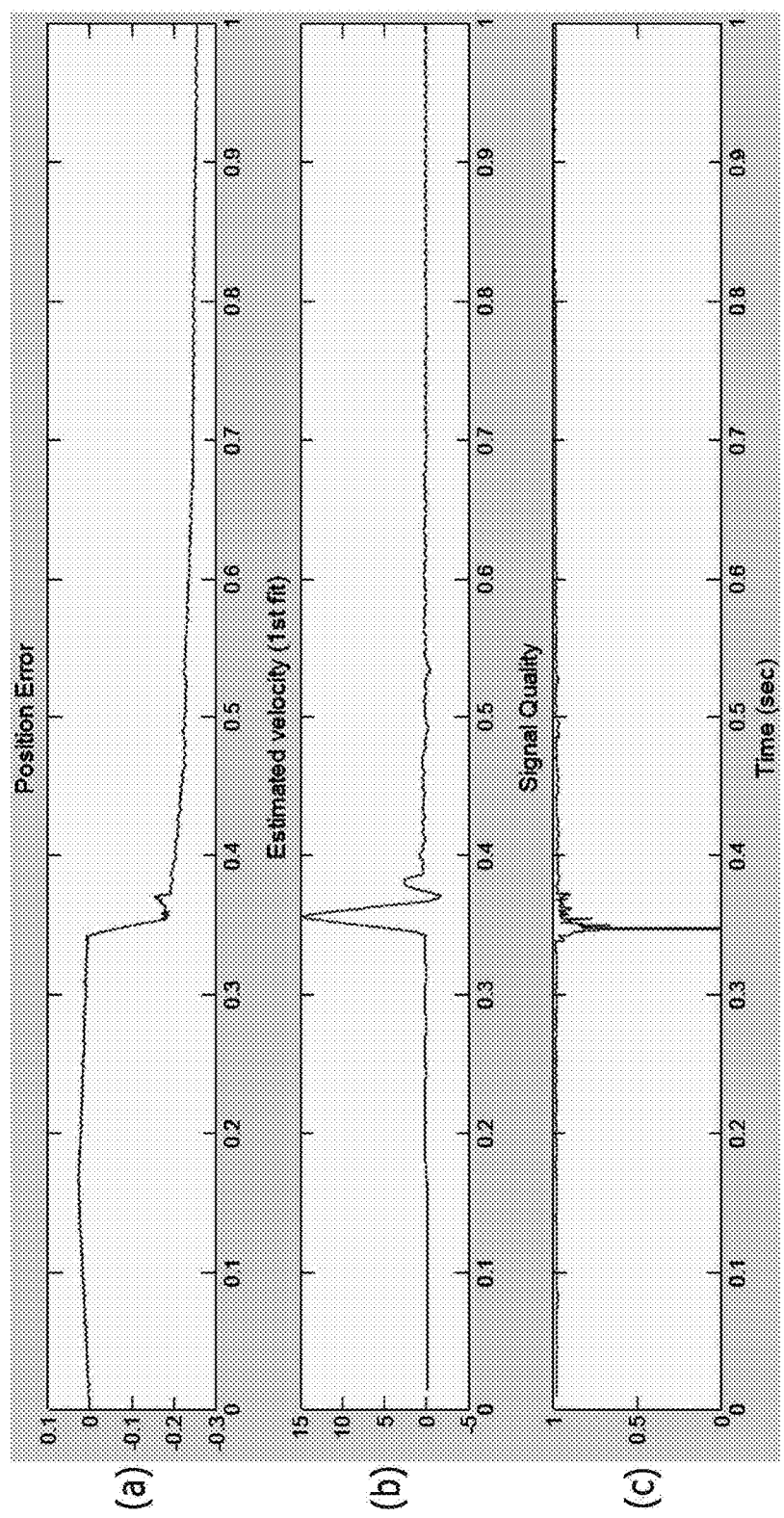

In the meantime, FIGS. 21 and 22, which are the same as FIGS. 19 and 20 except that an error source is introduced, are similar to the aforementioned tendency, so that an overlapping description will be omitted.

Now, an error which may influence the result measured by the method of measuring the web feeding velocity according to the exemplary embodiment of the present invention will be described.

As a result of the calculation by the method of measuring the web feeding velocity according to the exemplary embodiment of the present invention, it is exhibited that an influence by tensile stress is slight. As a result of an experiment, when tensile stress is changed by 20 N, an elongation ratio is 100 um/300 mm, which is just 0.3%, so that it is exhibited that an influence of the tensile stress on the result of the experiment is slight, but a pattern roll error or an error in the printing process influences the result of the experiment.

Further, it is exhibited that an error generated by rotation of light or an error according to a change in a line width also slightly influences the result of the experiment.

In the meantime, it is generally known that when the apparatus for measuring the web feeding velocity according to the exemplary embodiment of the present invention is manufactured, the scale is simultaneously purchased and used, but in this case, there is a concern that a measurement error is largely generated, so that the apparatus for measuring the web feeding velocity may be manufactured by simultaneously forming the scale when the web W is manufactured.

That is, when the scale used together with the apparatus for measuring the web feeding velocity according to the exemplary embodiment of the present invention is simultaneously molded when the web is manufactured to be used, an influence of a neighboring environment is less, so that it is possible to obtain a measurement result having higher accuracy.

In this case, the scale adopting a simultaneous molding method, by which the scale may be simultaneously molded when the web is manufactured, may be formed by using an imprint method or a photoetching method when the web is manufactured.

Further, the web itself, on which the scale adopting the simultaneous molding method is formed, may be simultaneously or separately sold with or from the apparatus for measuring the web feeding velocity according to the exemplary embodiment of the present invention.

As described above, the method of measuring the web feeding velocity according to the exemplary embodiment of the present invention may detect light passing through the mask and the scale with a single field by using the image sensor, calculate the scale pitch of the fed web by the detected signal, extract signals corresponding to four phases for one pitch based on the calculated scale pitch, and then measure the feeding velocity of the web by forming the Lissajous circle, so that it is possible to precisely measure the web feeding velocity even though the scale pitch or a line width is changed.

The present invention has been described in detail with reference to the exemplary embodiments, but the exemplary embodiments are illustrative and the present invention is not limited thereto. It is apparent that those skilled in the art may modify or improve the exemplary embodiments within the technical spirit of the present invention.

All of the simple modifications or changes of the present invention belong to the scope of the present invention, and the specific scope of the present invention may be apparent by the accompanying claims.

<Description of Symbols>

| | |
|---|---|
| 100: Apparatus for measuring web feeding velocity | 110: Image sensor |
| 111: Detection unit | W: Web |
| S: Web scale | R: Mask |

What is claimed is:

1. A method of measuring feeding velocity of a web, on which a scale having pitches different from pitches of a mask are formed, the method comprising:
   detecting a light passing through the mask and the scale by an image sensor;
   calculating a number of vibrations of a moiré image of the light passing through the mask and the scale;
   calculating pitches of the scale of the fed web based on the calculated number of vibrations of the moiré image;
   averaging the pitches of the scale so that a change in a pitch between adjacent timings among the calculated scale pitches of the scale is minimized;
   extracting first signals corresponding to our phases for one pitch based on the averaged pitches of the scale;
   calculating two second signals for forming a Lissajous circle from the first signals corresponding to 4 phases;
   correcting the Lissajous circle by correcting the two second signals; and
   calculating an angle of the Lissajous circle by the two second signals, and then calculating the feeding velocity of the web by using the calculated angle.

2. The method of claim 1, wherein
   the calculating of the number of vibrations of the moiré image includes extracting only a low band vibration number component in the signal generated by the image sensor, and then calculating the number of vibrations of the moiré image based on the extracted low band vibration number component.

3. The method of claim 2, wherein
   the calculating of the number of vibrations of the moiré image includes performing Fast Fourier Transform on the low band vibration number component, or performing auto-correlation and then Fast Fourier Transform on the low band vibration number component.

4. The method of claim 1, wherein the calculating of the number of vibrations of the moire image adopts at least one of a Gaussian window and a second order polynomial regression method in a log scale of a Fast Fourier Transform graph in order to improve accuracy of calculating the number of vibrations of the moire image.

5. The method of claim 1, wherein
   the calculating pitches of the scale of the fed web based on the calculated number of vibrations of the moiré image includes calculating the number of vibrations of the scale by Equation below, and then calculating the pitches of the scale based on the calculated number of vibrations of the scale:

$$f_s = f_r - f_b$$

wherein $f_s$ is a spatial frequency of the scale, $f_r$ is a spatial frequency of the mask, and $f_b$ is a frequency of the moiré image, and the Equation corresponds to a case where an interval of a grating of the mask is larger than that of a grating of the scale, and a case where the interval of the grating of the scale is larger than that of the grating of the mask, wherein for the case where the interval of the grating of the scale is larger than that of the grating of the mask, a negative (−) sign in the Equation is changed to a positive (+) sign.

6. The method of claim 1, wherein
   the averaging of the pitches of the scale includes processing a pitch at a specific time and pitches at a plurality of precedent times before the specific time by a least squares method to calculate the processed pitch as an averaged pitch of the scale, arithmetically averaging the pitch at the specific time and the pitches at the plurality of precedent times to calculate the arithmetically averaged pitch as the averaged pitch of the scale, or selecting the pitch at the specific time as the averaged pitch of the scale.

7. The method of claim 6, wherein the method further includes
   averaging signal intensities of the first signals corresponding to four phases (0°, 90°, 180°, and 270°) for one pitch based on the averaged pitch of the scale, and the two second signals for forming the Lissajous circle are calculated by Equations below:
   wherein $$\overline{u_1} = I_0 - I_{180},$$

$$\overline{u_2} = I_{90} - I_{270},$$

Herein, $\overline{u_1}$ and $\overline{u_2}$ are the two second signals,
   $I_0$ is a signal intensity at a phase of 0°,
   $I_{90}$ is a signal intensity at a phase of 90°,
   $I_{180}$ is a signal intensity at a phase of 180°, and
   $I_{270}$ is a signal intensity at a phase of 270°.

8. The method of claim 1, wherein
   a signal quality is calculated by Equation below after the correcting of the Lissajous circle, and when the signal quality is equal to or smaller than a predetermined threshold value, the calculated signal quality is ignored and a signal quality of a previous time zone is used:

$$SQ = 1 - \sum_{i=1}^{n_{p,ave}} \frac{d_i}{n_{p,ave}}$$

wherein SQ is the signal quality, $d_i$ is a distance to a circle having a radius of 1 at a point corresponding to the signal based on an $i^{th}$ pitch after the correction of the Lissajous circle, and $n_p$,ave is the number of signals facilitating a determination of the Lissajous circle.

9. The method of claim 1, wherein when there is a point at which the calculated feeding velocity of the web is changed, a plurality of image sensors having different characteristics are provided to receive signals of the light passing through the scale before and after the point at which the calculated feeding velocity of the web is changed, respectively.

10. The method of claim 1, wherein the light passing through the mask and the scale is detected by a single image sensor in which a plurality of detection units are integrated.

11. An apparatus for measuring feeding velocity of a web, on which a scale having a different pitch from a pitch of a mask is formed, the apparatus comprising:

a light source configured to provide collimated light to the mask side;

a single image sensor in which a plurality of detection units for detecting light emitted from the light source to pass through the scale are integrated; and a calculation unit configured to calculate feeding velocity of the web by using the signals detected by the single image sensor, wherein the calculation unit calculates the pitch of the scale of the fed web based on the detected signals, extracts first signals corresponding to four phases for one pitch based on the calculated pitch of the scale, forms a Lissajous circle by using the first signals corresponding to the four phases, corrects the Lissajous circle by correcting two second signals from the first signals corresponding to the four phases, and then calculates the feeding velocity of the web by using the formed Lissajous circle.

\* \* \* \* \*